United States Patent [19]

Sepso

[11] Patent Number: 4,530,216
[45] Date of Patent: Jul. 23, 1985

[54] REFRIGERATION SYSTEM, CONTROL DEVICE THEREFOR AND METHODS OF MAKING THE SAME

[75] Inventor: Roger P. Sepso, Stratford, Conn.

[73] Assignee: Robertshaw Controls Company, Richmond, Va.

[21] Appl. No.: 493,668

[22] Filed: May 11, 1983

[51] Int. Cl.³ ............................................. H05B 3/34
[52] U.S. Cl. ........................................ 62/89; 29/611; 219/549; 251/11
[58] Field of Search ................... 62/187, 89; 219/549, 219/311, 313; 236/68 R; 251/11; 165/46; 29/611, 157.3 C

[56] References Cited

U.S. PATENT DOCUMENTS

| | | | |
|---|---|---|---|
| 2,122,050 | 6/1938 | Stuart | 236/68 R |
| 2,367,368 | 1/1945 | Osterheld | 219/549 X |
| 3,414,231 | 12/1968 | Kreuter | 251/11 |
| 4,039,777 | 8/1977 | Baker | 219/535 X |
| 4,206,780 | 6/1980 | Manecke et al. | 137/387 |

OTHER PUBLICATIONS

Admitted Prior Known Refrigerator System and Control Device therefor.
Suggestion by a Non-Inventor.

*Primary Examiner*—William E. Wayner
*Attorney, Agent, or Firm*—Candor, Candor & Tassone

[57] ABSTRACT

A refrigerator system, a control device and methods of making the same are provided, the system having a frozen food compartment and a fresh food compartment operatively interconnected together by the control device having a housing provided with a passage interconnecting the compartments together, the housing having a movable damper valve member controlling the passage and a temperature responsive unit operatively interconnected to the valve member to move the valve member between open and closed positions thereof in relation to the temperature sensed by the unit. An electrical heater is carried by the housing and is disposed adjacent the temperature responsive unit to cause the temperature responsive unit to open the passage when the electrical heater has been energized for a certain period of time.

1 Claim, 7 Drawing Figures

REFRIGERATION SYSTEM, CONTROL DEVICE THEREFOR AND METHODS OF MAKING THE SAME

BACKGROUND OF THE INVENTION

1. Field of the Invention

This invention relates to an improved refrigerator system and to a control device for such a system or the like as well as to a method of making such a control device.

2. Prior Art Statement

It is known to provide a refrigerator system having a frozen food compartment and a fresh food compartment operatively interconnected together by a control device having a housing means provided with a passage interconnecting the compartments together, the housing means having a movable damper valve member controlling the passage and a temperature responsive unit operatively interconnected to the valve member to move the valve member between open and closed positions thereof in relation to the temperature sensed by the unit. The temperature responsive unit senses the ambient temperature in the fresh food compartment so that when the temperature in the fresh food compartment rises above a predetermined temperature, the valve member is opened to permit lower temperature air from the frozen food compartment to flow to the fresh food compartment to lower the temperature in the fresh food compartment to the predetermined temperature whereby the valve member is closed by the control device.

It was suggested to the applicant by another that perhaps the damper valve member could be electrically operated, such as with a solenoid, to control the flow of air from the frozen food compartment to the fresh food compartment in response to an electrical signal from an electrical circuit, such as a microprocessor controller for the refrigeration system.

It is also known to provide a temperature responsive device for operating certain structure by disposing an electrical heater means adjacent the temperature responsive device and energizing the heater means to cause the temperature responsive device to move a plunger thereof and thereby operate a part interconnected to the plunger. For example, see the U.S. Pat. No. 4,206,780 to Manecke et al, wherein the plunger of the temperature responsive device moves a selector member when the device is heated by an electrical heater means disposed adjacent the device.

SUMMARY OF THE INVENTION

It is one feature of this invention to provide an improved refrigerator system having means for controlling the flow of low temperature air from the frozen food compartment thereof to the fresh food compartment thereof in relation to a signal from an electrical circuit thereof.

In particular, it was found that an electronic circuit for a refrigerator system can be provided wherein a microprocessor controller can be utilized to regulate the flow of lower temperature air from the frozen food compartment to the fresh food compartment thereof so that the control device controlling the flow of air from the frozen food compartment to the fresh food compartment will not be dependent upon the temperature of the ambient air in the fresh food compartment as in prior known refrigerator systems.

Thus, it was found that the control device for the refrigerator system of this invention can maintain a reasonably constant temperature in the fresh food compartment of the refrigerator by modulation of a baffle or damper valve member disposed in the passage of the control device that leads from the frozen food compartment to the fresh food compartment and such operation can be controlled by regulating the amount of electrical energy to the control device and its time duration so that the baffle or damper valve member can be opened and closed at selected intervals in a control scheme provided by a microprocessor controller and/or a manual system as desired.

In particular, it was found according to the teachings of this invention that an electrical heater can be disposed adjacent the temperature responsive unit of the control device to control the operation thereof.

For example, one embodiment of this invention provides a refrigerator system having a frozen food compartment and a fresh food compartment operatively interconnected together by a control device having a housing means provided with a passage interconnecting the compartments together, the housing means having a movable damper valve member controlling the passage and a temperature responsive unit operatively interconnected to the valve member to move the valve member between open and closed positions thereof in relation to temperature sensed by the unit. An electrical heater means is carried by the housing means and is disposed adjacent the temperature responsive unit to cause the temperature responsive unit to open the passage when the electrical heater means has been energized for a certain period of time.

Accordingly, it is an object of this invention to provide an improved refrigerator system having one or more of the novel features of this invention as set forth above or hereinafter shown or described.

Another object of this invention is to provide an improved control device for a refrigerator system or the like, the control device of this invention having one or more of the novel features of this invention as set forth above or hereinafter shown or described.

Another object of this invention is to provide a method of making such a control device, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
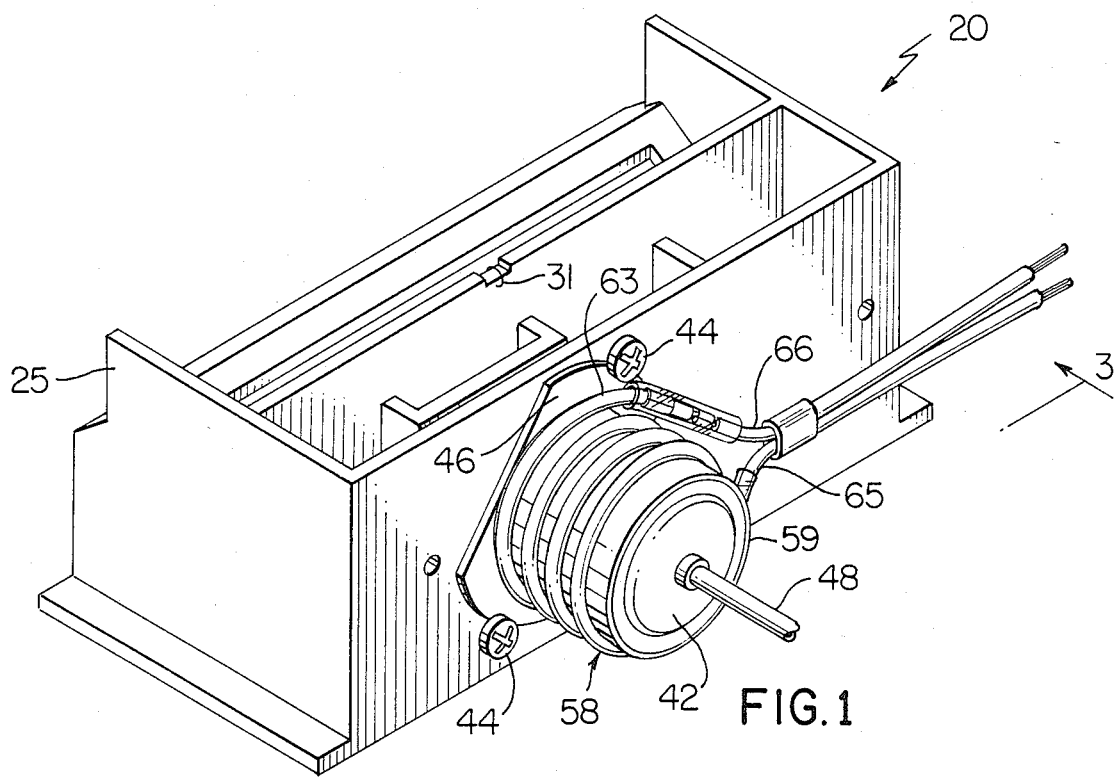
FIG. 1. is an isometric view illustrating one embodiment of the control device of this invention.

While the various features of this invention are hereinafter described and illustrated as being particularly adapted to provide a control device for a particular refrigerator system, it is to be understood that the various features of this invention can be utilized singly or in any combination thereof to provide a control device for other apparatus as desired.

Therefore, this invention is not to be limited to only the embodiments illustrated in the drawings, because the drawings are merely utilized to illustrate one of the wide variety of uses of this invention.

Figure 2:
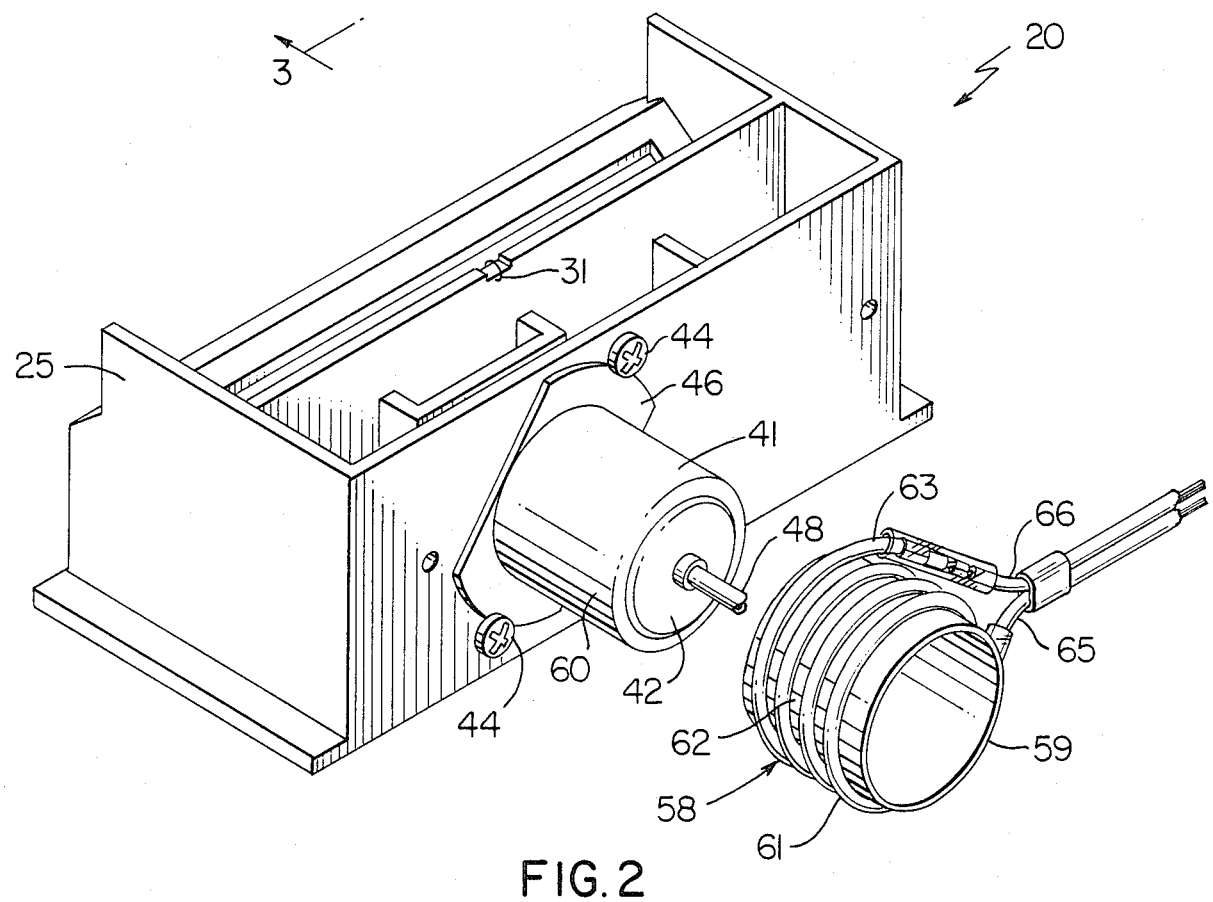
FIG. 2 is an exploded view similar to FIG. 1 and illustrates the heater means before the same has been assembled to the control device.
Figure 3:
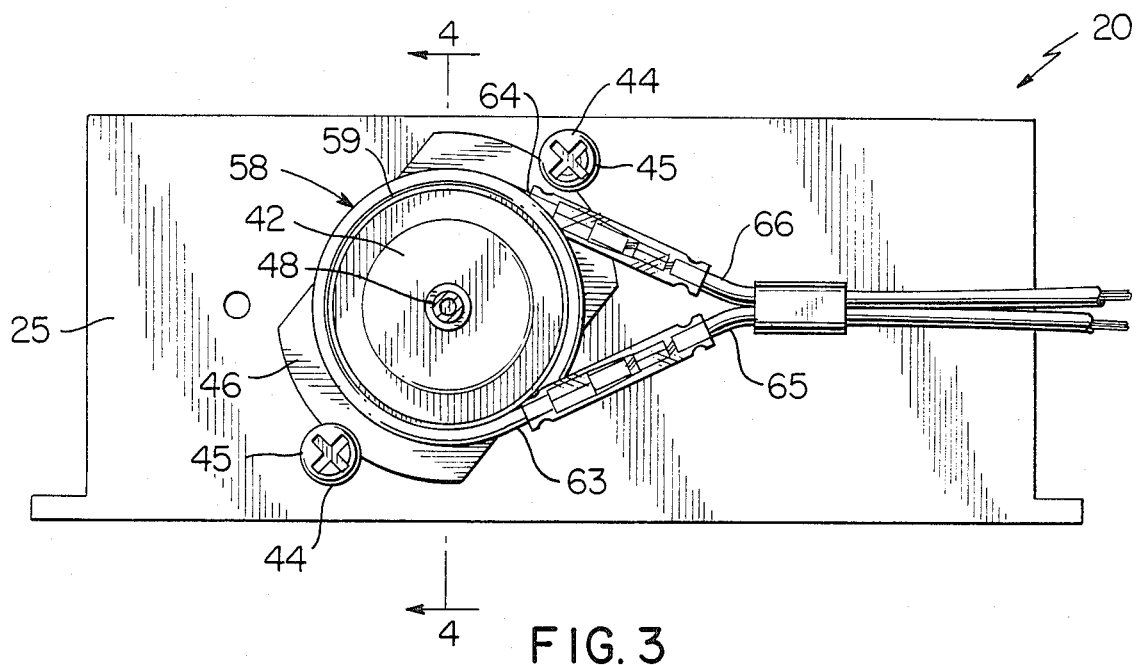
FIG. 3 is an enlarged end view of the control device of FIG. 1 and is taken in the direction of the arrows 3—3 of FIG. 1.
Figure 4:
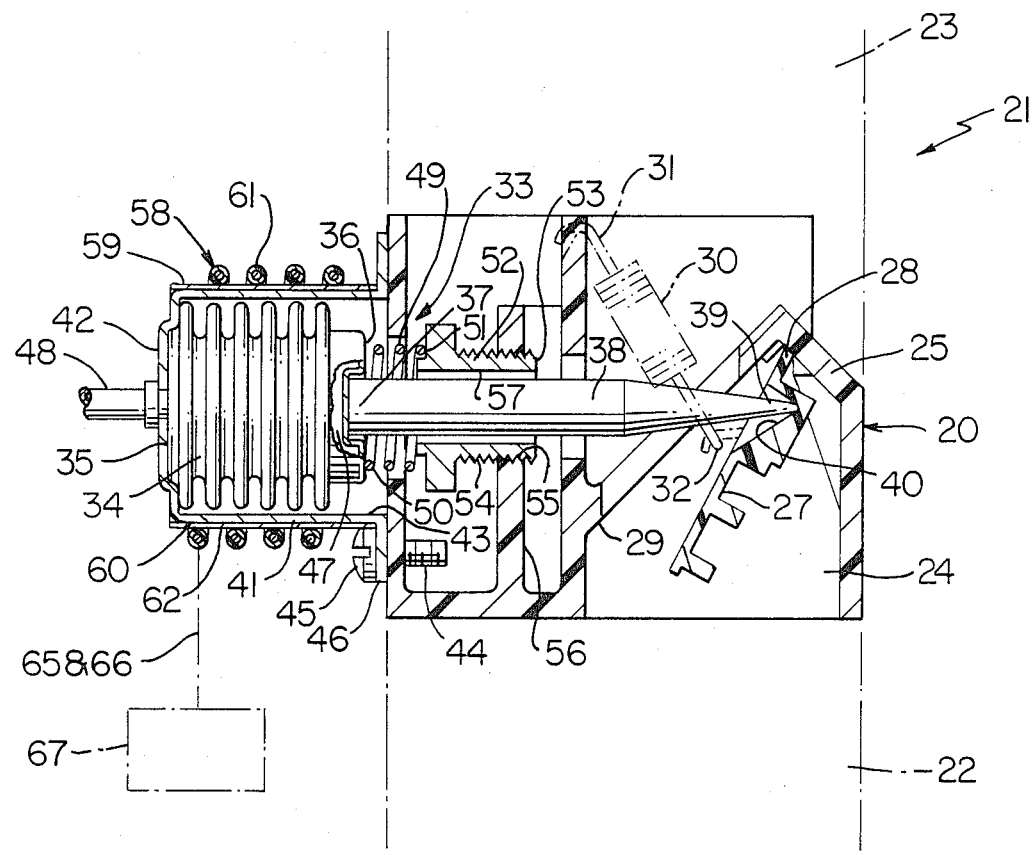
FIG. 4 is a cross-sectional view taken on line 4—4 of FIG. 3 and illustrates the control device of this invention as utilized in the refrigerator system of this invention, the refrigerator system being shown schematically in FIG. 4.

Referring now to FIGS. 1-4, the improved control device of this invention is generally indicated by the reference numeral 20 and is being utilized in the refrigerator system of this invention that is generally indicated by the reference numeral 21 in FIG. 4, the system 21 comprising a refrigerator (not shown) having a frozen food compartment 22 and a fresh food compartment 23 adapted to be interconnected together by a passage 24 formed through the housing means 25 of the control device 20 of this invention that is adapted to be carried by the refrigerator in any suitable manner, such as is schematically illustrated in FIG. 4.

The housing means 25 of the control device 20 can be formed of any suitable material, such as plastic material as shown, and has a baffle or damper valve member 27 that is pivotally mounted to the housing means 25 at one end 28 thereof in any suitable manner and that is adapted to close against a valve seat 29 of the housing means 25 to close the passage 24 in a manner well known in the art.

A tension spring 30 normally tends to close the valve member 27 against the valve seat 29 and hold the same in its closed condition by having one end 31 thereof secured to the housing means 25 and the other end 32 thereof interconnected to the valve member 27 in any suitable manner.

A temperature responsive unit that is generally indicated by the reference numeral 33 is carried by the control device 20 to operate the damper valve member 27 thereof, the temperature responsive unit 33 including a bellows construction 34 having a fixed end wall 35 and a movable end wall 36 that engages against an end 37 of an actuating plunger 38 that has its other end 39 disposed in a recess 40 of the valve member 27 whereby the force of the tension spring 30 maintains the valve member 27 against the end 39 of the plunger and thereby maintains the end 37 of the plunger 38 against the movable wall 36 of the bellows construction 34.

The bellows construction 34 is disposed in a cup-shaped casing member 41 that forms part of the housing means 25 of the control device 20, the cup-shaped casing 41 being formed of any suitable heat conductive material, such as metallic material, and having a closed end wall 42 against which the fixed end wall 35 of the bellows construction 34 is either secured or disposed thereagainst as the case may be while an open end 43 of the cup-shaped casing 41 is secured to the remainder of the housing means 25 by threaded fastening means 44 having enlarged heads 45 engaging against an outwardly turned annular flange 46 formed at the open end 43 of the cup-shaped casing 41.

The bellows construction 34 of the temperature responsive unit 33 has a chamber 47 therein which is adapted to receive a charge of a suitable temperature responsive fluid through a capillary tube 48 that is interconnected to the closed end wall 35 thereof so that after the charge of the temperature responsive fluid is disposed in the chamber 47 of the bellows construction 34, the capillary tube 48 can be closed off in a manner conventional in the art.

In this manner, when the temperature of the fluid in the chamber 47 of the bellows construction 34 increases, the same tends to expand in the bellows construction 34 and thereby tends to move the movable wall 36 of the bellows construction 34 away from the fixed wall 35 thereof and move the plunger 38 to the right in FIG. 4 to move the valve member 27 toward its open position in opposition to the force of the tension spring 31. Conversely, as the temperature of the fluid in the chamber 47 of the bellows construction 34 decreases, the volume thereof likewise decreases and thereby permits the valve member 27 to move toward the closed position thereof under the force of the tension spring 30 as the movable wall 36 moves toward the fixed wall 35 to compensate for the decrease in volume of the fluid in the chamber 47 in a manner well known in the art.

In order to adjust the operation of the bellows construction 34 so that the same will cause the valve member 27 to start to move to an open condition thereof when a certain predetermined temperature is being sensed by the bellows construction 34, a compression spring 49 has one end 50 thereof bearing against the movable wall 36 of the bellows construction 34 and the other end 51 thereof bearing against a tubular adjusting member 52 having an end 53 thereof externally threaded at 54 and being threadedly disposed in an internally threaded bore 55 of a flange 56 of the housing means 25 as illustrated in the drawings, the adjusting member 52 having an opening 57 passing therethrough whereby the plunger 38 is telescopically disposed in a loose manner within the opening 57 of the adjusting member 52 so as to be readily movable therein. Likewise, the compression spring 49 is telescopically disposed around the plunger 38 in a loose manner so that the plunger 38 can be readily moved relative thereto in the manner previously set forth.

Thus, it can be seen that by adjusting the threaded position of the threaded adjusting member 52 relative to the flange 56, the force of the compression spring 49 acting on the movable wall 36 of the bellows construction 34 can be changed to thereby select the temperature at which the bellows construction 34 will cause the plunger 38 to begin to open the valve member 27 for a purpose hereinafter described. For example, as will be apparent hereinafter, such selected temperature for the system 21 of the invention can be a temperature that is above the temperature normally encountered by the ambient air in the fresh food compartment 23 should the temperature responsive unit 33 be mounted so as to sense the temperature of the fresh food compartment 23.

As previously stated, it is a feature of this invention to provide means for actuating the temperature responsive unit 33 under the control of an electrical circuit of the refrigerator system 21.

Accordingly, the temperature responsive unit 33 of this invention includes an electrical heater means that is generally indicated by the reference numeral 58 and includes a conductive sleeve 59 disposed in telescopic relation on the cylindrical side wall 60 of the casing 41 and carrying an insulated electrical heater wire means 61 disposed in a coiled fashion on the outside surface 62 of the conductive sleeve 59 which can be formed of any suitable heat conductive material, such as the metallic material as illustrated.

The electrical heater wire means 61 has opposed ends 63 and 64 which are respectively coupled to suitable leads 65 and 66 in a conventional manner as illustrated in FIG. 3 to be interconnected to a suitable electrical power source that is indicated by the reference numeral 67 is FIG. 4 so that when the source 67 energized the heater means 58 by directing electric current through the heater wire means 61 thereof, the heat of the heater means 58 will cause the bellows construction 34 to heat to a temperature that causes the same to move the plunger 38 to the right in FIG. 4 and open the valve member 27 to interconnect the frozen food compartment 22 to the fresh food compartment 23 for a purpose hereinafter described. However, when the electrical current to the heater wire 61 is terminated by the device 67, the bellows construction 34 subsequently cools and thereby permits the plunger 38 to move to the left in FIG. 4 under the force of the tension spring 30 and thereby permit the valve member 27 to move to its closed condition to disconnect the frozen food compartment 22 from the fresh food compartment 23 for a purpose hereinafter described.

The heater means 58 can be secured on the casing 41 of the housing means 25 of the control device 20 in any suitable manner or may merely be press-fit thereon, FIG. 2 illustrating how the heater means 58 can be disposed in telescoping relation onto the casing 41 after the casing 41 has been secured to the remainder of the housing means 25 by the fastening means 44, as desired.

In any event, it can be seen that it is a relatively simple method of this invention to form the control device 20 to operate in the refrigerator system 21 in a manner now to be described.

Once the control device 20 has been assembled in the refrigerator system 21 as illustrated in FIG. 4 and the adjusting member 52 has been adjusted so as to cause the spring 49 to act on the movable wall 36 of the bellows construction 34 in such a manner that the bellows construction 34 will not open the valve member 27 to its fully open condition until after the heater means 58 has been energized by the source 67 for a certain period of time, such as by fully opening the valve member 27 after the heater means 58 has been continuously energized for approximately five minutes, the controller 67 in the system 21 maintains the valve member 27 in its closed position by not operating the heater means 61 so that the tension spring 30 can maintain the valve member 27 in its closed condition to prevent the lower temperature air from the freezer compartment 22 from reaching the fresh food compartment 23.

However, when the controller 67 determines that the frozen food compartment 22 should be interconnected to the fresh food compartment 23, the controller 67 energizes the heater means 58 by directing an electrical current flow through the heater wire means 61 which causes the fluid within the chamber 47 of the bellows construction 34 to heat up and thereby expand causing the movable wall 36 to move to the right in FIG. 4 in opposition to the force of the compression spring 49, as well as in opposition to the tension spring 30, until such forces are overcome so that the valve member 27 begins to open to interconnect the frozen food compartment 22 to the fresh food compartment 23, The valve member 27 continues to open and remain in the open condition as long as the heater means 58 is energized. However, once the heater means 58 is deenergized by the controller 67 disconnecting the electrical current from the heater wire means 61, the fluid in the bellows construction 34 begins to cool and thereby reduces its volume so that the movable wall 36 can move back to the left in FIG. 4 under the force of the compression spring 49, as well as the force of the tension spring 30, to cause the valve member 27 to begin to close. Once the temperature of the fluid in the chamber 47 of the valve construction 34 has cooled to a certain temperature, the valve member 27 will be disposed in its closed condition against the valve seat 29 to prevent the air from the frozen food compartment 22 from reaching the fresh food compartment 23, such fully closing of the valve member 27 against the seat 29 taking a certain period of time after the heater means 58 has been initially de-energized.

In this manner, the controller 67 can permit the fresh food compartment to have sufficient air from the frozen food compartment 22 directed thereto through the control device 20 should the fresh food compartment be freshly stocked with a large amount of fresh food which would normally change the ambient temperature therein requiring a longer period for the frozen food compartment 22 to cool the same than would be the case if the unit 33 was responsive only to the air being circulater in the fresh air compartment as in the prior art.

Figure 6:
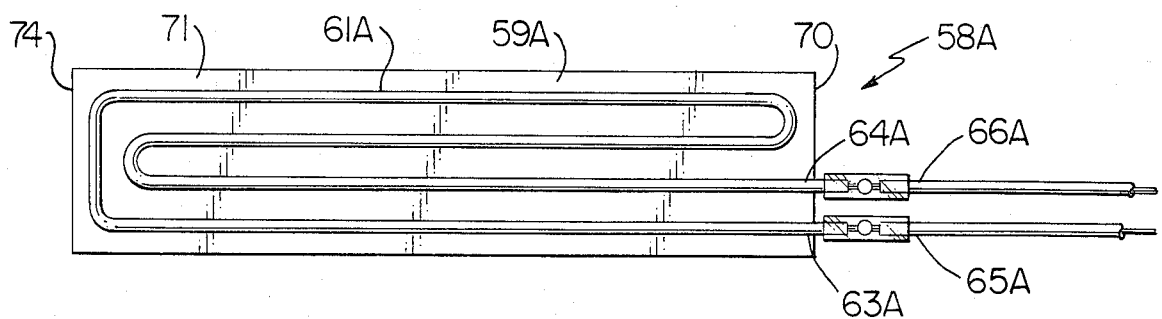
FIG. 6 is a plan view of the heater means of this invention for the control device of FIG. 5.
Figure 7:
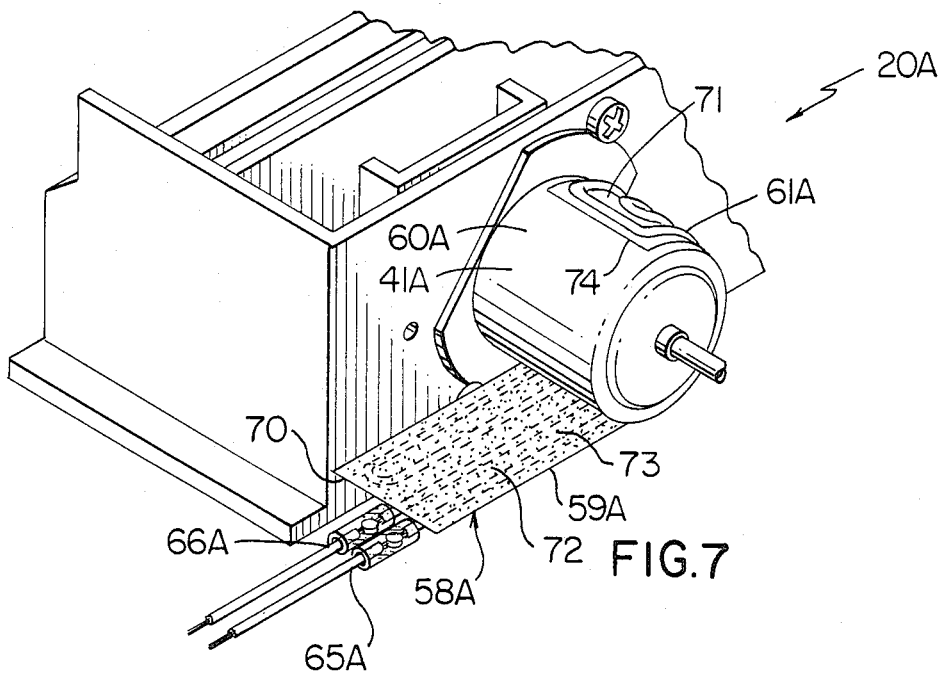
FIG. 7 is a view similar to FIG. 5 and illustrates one of the steps in the method of this invention for securing the heater means of FIG. 6 to form the control device of FIG. 5.
Figure 5:
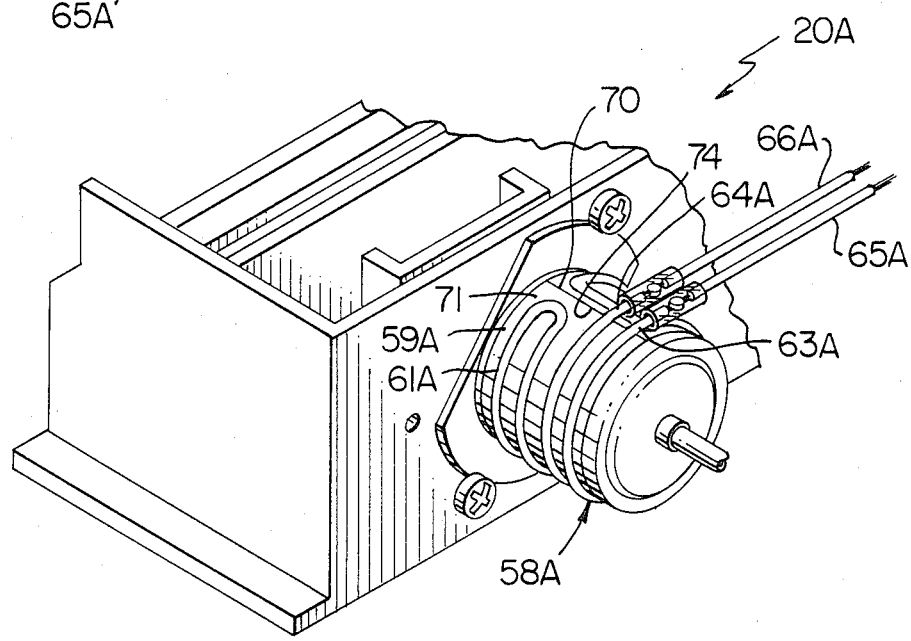
FIG. 5 is a fragmentary view similar to FIG. 1 and illustrates another embodiment of the control device of this invention.

Another control device of this invention is generally indicated by the reference numeral 20A in FIGS. 5-7 and parts thereof similar to the control device 20 previously described are indicated by like reference numerals followed by the reference letter "A".

As illustrated in FIGS. 5-7, the control device 20A is substantially the same as the control device 20 previously described except that the same has the heater means 58A thereof formed from a strip of metallic foil 59A formed in substantially rectangular form as illustrated in FIG. 6 and having the heater wire means 61A disposed thereon in the pattern or configuration illustrated in FIG. 6 so that the opposed ends 63A and 64A thereof can be interconnected to the leads 65A and 66A in any suitable manner at the end 70 of the tape 59A as illustrated in FIG. 6, the heater wire means 61A being secured to the side 71 of the tape 59A in any suitable manner, such as by adhesive means or the like.

The other side 72 of the tape-like member 59A is covered with pressure sensitive adhesive means 73 or other adhesive means as illustrated in FIG. 7 so that the same can be directly secured onto the cylindrical surface 62A of the casing 41A of the control device 20A whereby the opposed ends 70 and 74 of the tape-like member 59A can be disposed in abutting or slightly overlapping relation as the case may be to permit the leads 65A and 66A to extend beyond the tape-like member 59A as illustrated in FIG. 5. Thus, the heater means 58A can readily be secured on the casing 41A in a relatively simple manner by the method of this invention.

The operation of the control device 20A is substantially the same as the control device 20 previously described whereby the operation of the control device 20A need not be repeated.

Nevertheless, it can be seen that the control device 20 or 20A can be utilized in a refrigerator system that has a frozen food compartment and a fresh food compartment operatively interconnected together by the passage in the housing means of the control device of this invention so that the movable damper valve member thereof will control the passage by the temperature responsive unit of the control device that is operatively interconnected to the valve member to move the valve member between the open and closed positions thereof. The control device 20 or 20A of this invention includes an electrical heater means that is disposed adjacent the temperature responsive unit thereof to cause the temperature responsive unit to open the passage when the electrical heater means has been energized for a certain period of time.

In this manner, the baffle or valve member of the control device of this invention can be opened as long as desired, practically irrespective of refrigerator ambient temperature, such as when the fresh food compartment is opened for an extended period of time and restocked with a large grocery order. Also, the control device of this invention eliminates cross ambient problems in which the control device would respond to the colder temperature of the freezer air entering the fresh food compartment rather than the fresh food compartment ambient temperature. In addition, an even time sequence for the valve member to open or close can be achieved by the contol device of this invention thus giving an even open/closed cycle. For example, the amount of time that the baffle or valve member will remain open/closed can also be accomplished by the design of the control device of this invention and as to how often the baffle opens and closes can be designed through the cycle frequency thereof. Also, the time of "heater on" can be adjusted outside of the refrigerator by the consumer with a potentiometer adjustment or the like.

Therefore, it can be seen that this invention not only provides an improved refrigerator system and control device therefor, but also this invention provides an improved method of making such a control device.

While the various forms and methods of this invention now preferred have been illustrated and described as required by the Patent Statute, it is to be understood that other forms and method steps can be utilized and still fall within the scope of the appended claims.

What is claimed is:

1. In a method of making a control device for a refrigerator system having a frozen food compartment and a fresh food compartment, said method comprising the steps of forming the housing means of said control device with a passage adapted to operatively interconnect said compartments together, forming said housing means to have a movable damper valve member controlling said passage, forming said housing means to have a temperature responsive unit operatively interconnected to said valve member to move said valve member between open and closed positions thereof in relation to temperature sensed by said unit, forming said temperature responsive unit to comprise a bellows construction, and forming said housing means to have a substantially cylindrical casing surrounding said bellows construction, the improvement comprising the steps of forming an electrical heater means to be carried by said housing means adjacent said temperature responsive unit to cause said temperature responsive unit to open said passage when said electrical heater means has been energized for a certain period of time, forming said electrical heater means to include a conductive sleeve telescopically disposed onto said cylindrical casing, forming said electrical heater means to include a heater wire means carried by said sleeve, forming said conductive sleeve to comprise a metal foil tape-like member, securing one side of said foil tape-like member to said cylindrical casing with adhesive means, and securing said heater wire means to the other side of said foil tape-like member with adhesive means.

* * * * *